United States Patent
Li

(10) Patent No.: US 11,556,277 B2
(45) Date of Patent: Jan. 17, 2023

(54) SYSTEM AND METHOD FOR FACILITATING IMPROVED PERFORMANCE IN ORDERING KEY-VALUE STORAGE WITH INPUT/OUTPUT STACK SIMPLIFICATION

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 339 days.

(21) Appl. No.: 16/877,868

(22) Filed: May 19, 2020

(65) Prior Publication Data

US 2021/0365208 A1    Nov. 25, 2021

(51) Int. Cl.
*G06F 11/14*    (2006.01)
*G06F 3/06*    (2006.01)

(52) U.S. Cl.
CPC ............ *G06F 3/0659* (2013.01); *G06F 3/068* (2013.01); *G06F 3/0619* (2013.01); *G06F 11/1469* (2013.01); *G06F 2201/84* (2013.01)

(58) Field of Classification Search
CPC .. G06F 11/14; G06F 11/1469; G06F 11/1446; G06F 11/0793
See application file for complete search history.

(56) References Cited

U.S. PATENT DOCUMENTS 3,893,071 A    7/1975   Bossen
4,562,494 A    12/1985  Bond
(Continued)

FOREIGN PATENT DOCUMENTS

JP    2003022209    1/2003
JP    2011175422    9/2011
(Continued)

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

(Continued)

*Primary Examiner* — Kamini B Patel
(74) *Attorney, Agent, or Firm* — Shun Yao; Yao Legal Services, Inc.

(57) ABSTRACT

During operation, a key-value storage system can receive a request to write data to a data region in a first non-volatile memory. The system can determine a key associated with the data and the key can correspond to an entry in a data structure maintained by a volatile memory the storage system. In response to determining the key, the system can write the data to the data region in the first non-volatile memory. The system can update in the volatile memory the data structure entry corresponding to the key with a physical location in the data region of the first non-volatile memory to which the data is written. The system can write the data structure update to a second non-volatile memory. The system can then store a snapshot of the data structure in a metadata region associated with the first non-volatile memory, thereby allowing persistent storage of the data structure.

18 Claims, 8 Drawing Sheets

(56) References Cited

U.S. PATENT DOCUMENTS

| | | |
|---|---|---|
| 4,718,067 A | 1/1988 | Peters |
| 4,775,932 A | 10/1988 | Oxley |
| 4,858,040 A | 8/1989 | Hazebrouck |
| 5,394,382 A | 2/1995 | Hu |
| 5,602,693 A | 2/1997 | Brunnett |
| 5,715,471 A | 2/1998 | Otsuka |
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,226,650 B1 | 5/2001 | Mahajan et al. |
| 6,243,795 B1 | 6/2001 | Yang |
| 6,457,104 B1 | 9/2002 | Tremaine |
| 6,658,478 B1 | 12/2003 | Singhal |
| 6,795,894 B1 | 9/2004 | Neufeld |
| 7,351,072 B2 | 4/2008 | Muff |
| 7,565,454 B2 | 7/2009 | Zuberi |
| 7,599,139 B1 | 10/2009 | Bombet |
| 7,953,899 B1 | 5/2011 | Hooper |
| 7,958,433 B1 | 6/2011 | Yoon |
| 8,024,719 B2 * | 9/2011 | Gorton, Jr. ............. G06F 8/443 707/747 |
| 8,085,569 B2 | 12/2011 | Kim |
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,527,544 B1 | 9/2013 | Colgrove |
| 8,751,763 B1 | 6/2014 | Ramarao |
| 8,819,367 B1 | 8/2014 | Fallone |
| 8,825,937 B2 | 9/2014 | Atkisson |
| 8,832,688 B2 | 9/2014 | Tang |
| 8,868,825 B1 | 10/2014 | Hayes |
| 8,904,061 B1 | 12/2014 | O'Brien, III |
| 8,949,208 B1 | 2/2015 | Xu |
| 9,015,561 B1 | 4/2015 | Hu |
| 9,031,296 B2 | 5/2015 | Kaempfer |
| 9,043,545 B2 | 5/2015 | Kimmel |
| 9,088,300 B1 | 7/2015 | Chen |
| 9,092,223 B1 | 7/2015 | Pani |
| 9,129,628 B1 | 9/2015 | Fallone |
| 9,141,176 B1 | 9/2015 | Chen |
| 9,208,817 B1 | 12/2015 | Li |
| 9,213,627 B2 | 12/2015 | Van Acht |
| 9,213,632 B1 | 12/2015 | Song |
| 9,251,058 B2 * | 2/2016 | Nellans ............... G06F 12/0246 |
| 9,258,014 B2 | 2/2016 | Anderson |
| 9,280,472 B1 | 3/2016 | Dang |
| 9,280,487 B2 | 3/2016 | Candelaria |
| 9,311,939 B1 | 4/2016 | Malina |
| 9,336,340 B1 | 5/2016 | Dong |
| 9,436,595 B1 | 9/2016 | Benitez |
| 9,495,263 B2 | 11/2016 | Pang |
| 9,529,601 B1 | 12/2016 | Dharmadhikari |
| 9,529,670 B2 | 12/2016 | O'Connor |
| 9,569,454 B2 | 2/2017 | Ebsen |
| 9,575,982 B1 | 2/2017 | Sankara Subramanian |
| 9,588,698 B1 | 3/2017 | Karamcheti |
| 9,588,977 B1 | 3/2017 | Wang |
| 9,607,631 B2 | 3/2017 | Rausch |
| 9,671,971 B2 | 6/2017 | Trika |
| 9,722,632 B2 | 8/2017 | Anderson |
| 9,747,202 B1 | 8/2017 | Shaharabany |
| 9,830,084 B2 | 11/2017 | Thakkar |
| 9,836,232 B1 | 12/2017 | Vasquez |
| 9,852,076 B1 | 12/2017 | Garg |
| 9,875,053 B2 | 1/2018 | Frid |
| 9,910,705 B1 | 3/2018 | Mak |
| 9,912,530 B2 | 3/2018 | Singatwaria |
| 9,923,562 B1 | 3/2018 | Vinson |
| 9,933,973 B2 | 4/2018 | Luby |
| 9,946,596 B2 | 4/2018 | Hashimoto |
| 10,013,169 B2 | 7/2018 | Fisher |
| 10,199,066 B1 | 2/2019 | Feldman |
| 10,229,735 B1 | 3/2019 | Natarajan |
| 10,235,198 B2 | 3/2019 | Qiu |
| 10,268,390 B2 | 4/2019 | Warfield |
| 10,318,467 B2 | 6/2019 | Barzik |
| 10,361,722 B2 | 7/2019 | Lee |
| 10,417,086 B2 | 9/2019 | Lin |
| 10,437,670 B1 | 10/2019 | Koltsidas |
| 10,459,663 B2 | 10/2019 | Agombar |
| 10,459,794 B2 | 10/2019 | Baek |
| 10,466,907 B2 * | 11/2019 | Gole ..................... G06F 3/0689 |
| 10,484,019 B2 | 11/2019 | Weinberg |
| 10,530,391 B2 | 1/2020 | Galbraith |
| 10,635,529 B2 | 4/2020 | Bolkhovitin |
| 10,642,522 B2 | 5/2020 | Li |
| 10,649,657 B2 | 5/2020 | Zaidman |
| 10,649,969 B2 * | 5/2020 | De ..................... G06F 16/2255 |
| 10,678,432 B1 | 6/2020 | Dreier |
| 10,756,816 B1 | 8/2020 | Dreier |
| 10,831,734 B2 * | 11/2020 | Li ..................... G06F 12/0246 |
| 10,928,847 B2 | 2/2021 | Suresh |
| 10,990,526 B1 | 4/2021 | Lam |
| 11,016,932 B2 * | 5/2021 | Qiu ....................... G06F 16/13 |
| 11,023,150 B2 | 6/2021 | Pletka |
| 11,068,165 B2 | 7/2021 | Sharon |
| 11,068,409 B2 * | 7/2021 | Li ..................... G06F 3/0658 |
| 11,126,561 B2 * | 9/2021 | Li ..................... G06F 12/1009 |
| 11,138,124 B2 | 10/2021 | Tomic |
| 11,243,694 B2 * | 2/2022 | Liang .................. G06F 3/0619 |
| 11,360,863 B2 * | 6/2022 | Varadan ............. G06F 11/2069 |
| 2001/0003205 A1 | 6/2001 | Gilbert |
| 2001/0032324 A1 | 10/2001 | Slaughter |
| 2001/0046295 A1 | 11/2001 | Sako |
| 2002/0010783 A1 | 1/2002 | Primak |
| 2002/0039260 A1 | 4/2002 | Kilmer |
| 2002/0073358 A1 | 6/2002 | Atkinson |
| 2002/0095403 A1 | 7/2002 | Chandrasekaran |
| 2002/0112085 A1 | 8/2002 | Berg |
| 2002/0161890 A1 | 10/2002 | Chen |
| 2003/0074319 A1 | 4/2003 | Jaquette |
| 2003/0145274 A1 | 7/2003 | Hwang |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0066741 A1 | 4/2004 | Dinker |
| 2004/0103238 A1 | 5/2004 | Avraham |
| 2004/0143718 A1 | 7/2004 | Chen |
| 2004/0255171 A1 | 12/2004 | Zimmer |
| 2004/0267752 A1 | 12/2004 | Wong |
| 2004/0268278 A1 | 12/2004 | Hoberman |
| 2005/0038954 A1 | 2/2005 | Saliba |
| 2005/0097126 A1 | 5/2005 | Cabrera |
| 2005/0138325 A1 | 6/2005 | Hofstee |
| 2005/0144358 A1 | 6/2005 | Conley |
| 2005/0149827 A1 | 7/2005 | Lambert |
| 2005/0174670 A1 | 8/2005 | Dunn |
| 2005/0177672 A1 | 8/2005 | Rao |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0031709 A1 | 2/2006 | Hiraiwa |
| 2006/0101197 A1 | 5/2006 | Georgis |
| 2006/0156009 A1 | 7/2006 | Shin |
| 2006/0156012 A1 | 7/2006 | Beeson |
| 2006/0184813 A1 | 8/2006 | Bui |
| 2007/0033323 A1 | 2/2007 | Gorobets |
| 2007/0061502 A1 | 3/2007 | Lasser |
| 2007/0101096 A1 | 5/2007 | Gorobets |
| 2007/0204128 A1 | 8/2007 | Lee |
| 2007/0250756 A1 | 10/2007 | Gower |
| 2007/0266011 A1 | 11/2007 | Rohrs |
| 2007/0283081 A1 | 12/2007 | Lasser |
| 2007/0283104 A1 | 12/2007 | Wellwood |
| 2007/0285980 A1 | 12/2007 | Shimizu |
| 2008/0028223 A1 | 1/2008 | Rhoads |
| 2008/0034154 A1 | 2/2008 | Lee |

(56) References Cited

U.S. PATENT DOCUMENTS

| | | |
|---|---|---|
| 2008/0065805 A1 | 3/2008 | Wu |
| 2008/0082731 A1 | 4/2008 | Karamcheti |
| 2008/0104369 A1 | 5/2008 | Reed |
| 2008/0112238 A1 | 5/2008 | Kim |
| 2008/0163033 A1 | 7/2008 | Yim |
| 2008/0195829 A1 | 8/2008 | Wilsey |
| 2008/0301532 A1 | 12/2008 | Uchikawa |
| 2009/0006667 A1 | 1/2009 | Lin |
| 2009/0089544 A1 | 4/2009 | Liu |
| 2009/0110078 A1 | 4/2009 | Crinon |
| 2009/0113219 A1 | 4/2009 | Aharonov |
| 2009/0125788 A1 | 5/2009 | Wheeler |
| 2009/0177944 A1 | 7/2009 | Kanno |
| 2009/0183052 A1 | 7/2009 | Kanno |
| 2009/0254705 A1 | 10/2009 | Abali |
| 2009/0282275 A1 | 11/2009 | Yermalayeu |
| 2009/0287956 A1 | 11/2009 | Flynn |
| 2009/0307249 A1 | 12/2009 | Koifman |
| 2009/0307426 A1 | 12/2009 | Galloway |
| 2009/0310412 A1 | 12/2009 | Jang |
| 2010/0031000 A1 | 2/2010 | Flynn |
| 2010/0169470 A1 | 7/2010 | Takashige |
| 2010/0217952 A1 | 8/2010 | Iyer |
| 2010/0229224 A1 | 9/2010 | Etchegoyen |
| 2010/0241848 A1 | 9/2010 | Smith |
| 2010/0281254 A1 | 11/2010 | Carro |
| 2010/0321999 A1 | 12/2010 | Yoo |
| 2010/0325367 A1 | 12/2010 | Kornegay |
| 2010/0332922 A1 | 12/2010 | Chang |
| 2011/0031546 A1 | 2/2011 | Uenaka |
| 2011/0055458 A1 | 3/2011 | Kuehne |
| 2011/0055471 A1 | 3/2011 | Thatcher |
| 2011/0060722 A1 | 3/2011 | Li |
| 2011/0072204 A1 | 3/2011 | Chang |
| 2011/0099418 A1 | 4/2011 | Chen |
| 2011/0153903 A1 | 6/2011 | Hinkle |
| 2011/0161621 A1 | 6/2011 | Sinclair |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0289263 A1 | 11/2011 | Mcwilliams |
| 2011/0289280 A1 | 11/2011 | Koseki |
| 2011/0292538 A1 | 12/2011 | Haga |
| 2011/0296411 A1 | 12/2011 | Tang |
| 2011/0299317 A1 | 12/2011 | Shaeffer |
| 2011/0302353 A1 | 12/2011 | Confalonieri |
| 2011/0302408 A1 | 12/2011 | Mcdermott |
| 2012/0017037 A1 | 1/2012 | Riddle |
| 2012/0039117 A1 | 2/2012 | Webb |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0151253 A1 | 6/2012 | Horn |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0233523 A1 | 9/2012 | Krishnamoorthy |
| 2012/0246392 A1 | 9/2012 | Cheon |
| 2012/0278579 A1 | 11/2012 | Goss |
| 2012/0284587 A1 | 11/2012 | Yu |
| 2012/0324312 A1 | 12/2012 | Moyer |
| 2012/0331207 A1 | 12/2012 | Lassa |
| 2013/0013880 A1 | 1/2013 | Tashiro |
| 2013/0013887 A1 | 1/2013 | Sugahara |
| 2013/0016970 A1 | 1/2013 | Koka |
| 2013/0018852 A1 | 1/2013 | Barton |
| 2013/0024605 A1 | 1/2013 | Sharon |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0138871 A1 | 5/2013 | Chiu |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0159723 A1 | 6/2013 | Brandt |
| 2013/0166820 A1 | 6/2013 | Batwara |
| 2013/0173845 A1 | 7/2013 | Aslam |
| 2013/0179898 A1 | 7/2013 | Fang |
| 2013/0191601 A1 | 7/2013 | Peterson |
| 2013/0205183 A1 | 8/2013 | Fillingim |
| 2013/0219131 A1 | 8/2013 | Alexandron |
| 2013/0227347 A1 | 8/2013 | Cho |
| 2013/0238955 A1 | 9/2013 | D Abreu |
| 2013/0254622 A1 | 9/2013 | Kanno |
| 2013/0318283 A1 | 11/2013 | Small |
| 2013/0318395 A1 | 11/2013 | Kalavade |
| 2013/0329492 A1 | 12/2013 | Yang |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0082412 A1 | 3/2014 | Matsumura |
| 2014/0095758 A1 | 4/2014 | Smith |
| 2014/0095769 A1 | 4/2014 | Borkenhagen |
| 2014/0095827 A1 | 4/2014 | Wei |
| 2014/0108414 A1 | 4/2014 | Stillerman |
| 2014/0108891 A1 | 4/2014 | Strasser |
| 2014/0164447 A1 | 6/2014 | Tarafdar |
| 2014/0164879 A1 | 6/2014 | Tam |
| 2014/0181532 A1 | 6/2014 | Camp |
| 2014/0195564 A1 | 7/2014 | Talagala |
| 2014/0215129 A1 | 7/2014 | Kuzmin |
| 2014/0223079 A1 | 8/2014 | Zhang |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0337457 A1 | 11/2014 | Nowoczynski |
| 2014/0359229 A1 | 12/2014 | Cota-Robles |
| 2014/0365707 A1 | 12/2014 | Talagala |
| 2014/0379965 A1 | 12/2014 | Gole |
| 2015/0006792 A1 | 1/2015 | Lee |
| 2015/0019798 A1 | 1/2015 | Huang |
| 2015/0039849 A1 | 2/2015 | Lewis |
| 2015/0067436 A1 | 3/2015 | Hu |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0143030 A1 | 5/2015 | Gorobets |
| 2015/0186657 A1 | 7/2015 | Nakhjiri |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0286477 A1 | 10/2015 | Mathur |
| 2015/0294684 A1 | 10/2015 | Qjang |
| 2015/0301964 A1 | 10/2015 | Brinicombe |
| 2015/0304108 A1 | 10/2015 | Obukhov |
| 2015/0310916 A1 | 10/2015 | Leem |
| 2015/0317095 A1 | 11/2015 | Voigt |
| 2015/0341123 A1 | 11/2015 | Nagarajan |
| 2015/0347025 A1 | 12/2015 | Law |
| 2015/0363271 A1 | 12/2015 | Haustein |
| 2015/0363328 A1 | 12/2015 | Candelaria |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048327 A1 | 2/2016 | Jayasena |
| 2016/0048341 A1 | 2/2016 | Constantinescu |

(56) References Cited

U.S. PATENT DOCUMENTS

| | | |
|---|---|---|
| 2016/0054922 A1 | 2/2016 | Awasthi |
| 2016/0062885 A1 | 3/2016 | Ryu |
| 2016/0077749 A1 | 3/2016 | Ravimohan |
| 2016/0077764 A1 | 3/2016 | Ori |
| 2016/0077968 A1 | 3/2016 | Sela |
| 2016/0078245 A1 | 3/2016 | Amarendran |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0124742 A1 | 5/2016 | Rangasamy |
| 2016/0132237 A1 | 5/2016 | Jeong |
| 2016/0141047 A1 | 5/2016 | Sehgal |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0203000 A1 | 7/2016 | Parmar |
| 2016/0224267 A1 | 8/2016 | Yang |
| 2016/0232103 A1 | 8/2016 | Schmisseur |
| 2016/0234297 A1 | 8/2016 | Ambach |
| 2016/0239074 A1 | 8/2016 | Lee |
| 2016/0239380 A1 | 8/2016 | Wideman |
| 2016/0274636 A1 | 9/2016 | Kim |
| 2016/0283140 A1 | 9/2016 | Kaushik |
| 2016/0306699 A1 | 10/2016 | Resch |
| 2016/0306853 A1 | 10/2016 | Sabaa |
| 2016/0321002 A1 | 11/2016 | Jung |
| 2016/0335085 A1 | 11/2016 | Scalabrino |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2016/0381442 A1 | 12/2016 | Heanue |
| 2017/0004037 A1 | 1/2017 | Park |
| 2017/0010652 A1 | 1/2017 | Huang |
| 2017/0068639 A1 | 3/2017 | Davis |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0123655 A1 | 5/2017 | Sinclair |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0185316 A1 | 6/2017 | Nieuwejaar |
| 2017/0185498 A1 | 6/2017 | Gao |
| 2017/0192848 A1 | 7/2017 | Pamies-Juarez |
| 2017/0199823 A1 | 7/2017 | Hayes |
| 2017/0212680 A1 | 7/2017 | Waghulde |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0262217 A1 | 9/2017 | Pradhan |
| 2017/0269998 A1 | 9/2017 | Sunwoo |
| 2017/0277655 A1 | 9/2017 | Das |
| 2017/0279460 A1 | 9/2017 | Camp |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0069658 A1 | 3/2018 | Benisty |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0113631 A1 | 4/2018 | Zhang |
| 2018/0143780 A1 | 5/2018 | Cho |
| 2018/0150640 A1 | 5/2018 | Li |
| 2018/0165038 A1 | 6/2018 | Authement |
| 2018/0165169 A1 | 6/2018 | Camp |
| 2018/0165340 A1 | 6/2018 | Agarwal |
| 2018/0167268 A1 | 6/2018 | Liguori |
| 2018/0173620 A1 | 6/2018 | Cen |
| 2018/0188970 A1 | 7/2018 | Liu |
| 2018/0189175 A1 | 7/2018 | Ji |
| 2018/0189182 A1 | 7/2018 | Wang |
| 2018/0212951 A1 | 7/2018 | Goodrum |
| 2018/0219561 A1 | 8/2018 | Litsyn |
| 2018/0226124 A1 | 8/2018 | Perner |
| 2018/0232151 A1 | 8/2018 | Badam |
| 2018/0260148 A1 | 9/2018 | Klein |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0307620 A1* | 10/2018 | Zhou ................. G06F 16/1847 |
| 2018/0321864 A1 | 11/2018 | Benisty |
| 2018/0322024 A1 | 11/2018 | Nagao |
| 2018/0329776 A1 | 11/2018 | Lai |
| 2018/0336921 A1 | 11/2018 | Ryun |
| 2018/0349396 A1 | 12/2018 | Blagojevic |
| 2018/0356992 A1 | 12/2018 | Lamberts |
| 2018/0357126 A1 | 12/2018 | Dhuse |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0034454 A1 | 1/2019 | Gangumalla |
| 2019/0042571 A1* | 2/2019 | Li ..................... G06F 16/2379 |
| 2019/0050312 A1 | 2/2019 | Li |
| 2019/0050327 A1 | 2/2019 | Li |
| 2019/0065085 A1 | 2/2019 | Jean |
| 2019/0073261 A1 | 3/2019 | Halbert |
| 2019/0073262 A1 | 3/2019 | Chen |
| 2019/0087089 A1 | 3/2019 | Yoshida |
| 2019/0087115 A1 | 3/2019 | Li |
| 2019/0087328 A1 | 3/2019 | Kanno |
| 2019/0108145 A1 | 4/2019 | Raghava |
| 2019/0116127 A1 | 4/2019 | Pismenny |
| 2019/0166725 A1 | 5/2019 | Jing |
| 2019/0171532 A1 | 6/2019 | Abadi |
| 2019/0172820 A1 | 6/2019 | Meyers |
| 2019/0196748 A1 | 6/2019 | Badam |
| 2019/0196907 A1 | 6/2019 | Khan |
| 2019/0205206 A1 | 7/2019 | Hornung |
| 2019/0212949 A1 | 7/2019 | Pletka |
| 2019/0220392 A1 | 7/2019 | Lin |
| 2019/0227927 A1 | 7/2019 | Miao |
| 2019/0272242 A1 | 9/2019 | Kachare |
| 2019/0278654 A1 | 9/2019 | Kaynak |
| 2019/0278849 A1* | 9/2019 | Chandramouli .. G06F 16/24565 |
| 2019/0317901 A1 | 10/2019 | Kachare |
| 2019/0320020 A1 | 10/2019 | Lee |
| 2019/0339998 A1 | 11/2019 | Momchilov |
| 2019/0361611 A1 | 11/2019 | Hosogi |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0042387 A1 | 2/2020 | Shani |
| 2020/0082006 A1 | 3/2020 | Rupp |
| 2020/0084918 A1 | 3/2020 | Shen |

(56) References Cited

U.S. PATENT DOCUMENTS

| | | |
|---|---|---|
| 2020/0089430 A1 | 3/2020 | Kanno |
| 2020/0092209 A1 | 3/2020 | Chen |
| 2020/0097189 A1 | 3/2020 | Tao |
| 2020/0133841 A1 | 4/2020 | Davis |
| 2020/0143885 A1 | 5/2020 | Kim |
| 2020/0159425 A1 | 5/2020 | Flynn |
| 2020/0167091 A1 | 5/2020 | Haridas |
| 2020/0210309 A1 | 7/2020 | Jung |
| 2020/0218449 A1 | 7/2020 | Leitao |
| 2020/0225875 A1 | 7/2020 | Oh |
| 2020/0242021 A1 | 7/2020 | Gholamipour |
| 2020/0250032 A1 | 8/2020 | Goyal |
| 2020/0257598 A1 | 8/2020 | Yazovitsky |
| 2020/0322287 A1 | 10/2020 | Connor |
| 2020/0326855 A1 | 10/2020 | Wu |
| 2020/0328192 A1 | 10/2020 | Zaman |
| 2020/0348888 A1 | 11/2020 | Kim |
| 2020/0364094 A1 | 11/2020 | Kahle |
| 2020/0371955 A1 | 11/2020 | Goodacre |
| 2020/0387327 A1 | 12/2020 | Hsieh |
| 2020/0401334 A1 | 12/2020 | Saxena |
| 2020/0409559 A1 | 12/2020 | Sharon |
| 2020/0409791 A1 | 12/2020 | Devriendt |
| 2021/0010338 A1 | 1/2021 | Santos |
| 2021/0075633 A1 | 3/2021 | Sen |
| 2021/0089392 A1 | 3/2021 | Shirakawa |
| 2021/0103388 A1 | 4/2021 | Choi |
| 2021/0124488 A1 | 4/2021 | Stoica |
| 2021/0132999 A1 | 5/2021 | Haywood |
| 2021/0191635 A1 | 6/2021 | Hu |
| 2021/0263795 A1* | 8/2021 | Li ............... G06F 11/1076 |
| 2021/0286555 A1 | 9/2021 | Li |

FOREIGN PATENT DOCUMENTS

| | | |
|---|---|---|
| WO | 9418634 | 8/1994 |
| WO | 1994018634 | 8/1994 |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India, pp. 1-7, 2017, <10.1145/3124680.3124741 >. <hal-01654985>.

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices"< FAST'11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14https://www.syncids.com/#.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime, " Design, Automation & Text in Europe Conference & Exhibition (DATE), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

C. Wu, D. Wu, H. Chou and C. Cheng, "Rethink the Design of Flash Translation Layers in a Component-Based View", in IEEE Acess, vol. 5, pp. 12895-12912, 2017.

Po-Liang Wu, Yuan-Hao Chang and T. Kuo, "A file-system-aware FTL design for flash-memory storage systems," 2009, pp. 393-398.

S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Saizburg, 2007, pp. 257-262.

A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.

J. Jung and Y. Won, "nvramdisk: A Transactional Block Device Driver for Non-Volatile RAM", in IEEE Transactions on Computers, vol. 65, No. 2, pp. 589-600, Feb. 1, 2016.

Te I et al. (Pensieve: a Machine Assisted SSD Layer for Extending the Lifetime: (Year: 2018).

ARM ("Cortex-R5 and Cortex-R5F", Technical reference Manual, Revision r1p1) (Year:2011).

* cited by examiner

| KEY INDEX 400 | PHYSICAL OFFSET AND LENGTH 402 |
|---|---|
| 0 | XXX |
| 1 | YYY |
| ... | ... |
| MAX KEY | ZZZ |

SYSTEM AND METHOD FOR FACILITATING IMPROVED PERFORMANCE IN ORDERING KEY-VALUE STORAGE WITH INPUT/OUTPUT STACK SIMPLIFICATION

BACKGROUND

Field

This disclosure is generally related to the field of data storage. More specifically, this disclosure is related to a system and method for facilitating improved performance in ordering key-value storage with input/output stack simplification.

Related Art

The proliferation of the Internet and e-commerce continues to create a vast amount of digital content. Various storage systems have been created to access and store such digital content. A storage system can include volatile memory (e.g., dynamic random access memory (DRAM)) and multiple drives (e.g., a solid state drive (SSD) or a hard disk drive (HDD)). A drive can include non-volatile memory in a physical storage medium for persistent storage, such as Not-And (NAND) flash memory in an SSD.

Due to the increasing use of cloud based services, there has been a demand for techniques for providing efficient management of the digital content stored in the storage systems while improving the performance of such storage systems. To do so, key-value stores are often used. A key-value store is similar to a dictionary or a hash table. The key-value store usually includes a collection of key-value pairs, with each data value in the key-value store being uniquely paired with only one key. In order to improve the handling of the key-value store, the keys are often arranged in a certain order.

Such an ordered key-value store may require periodic sorting of the keys to maintain a certain order, e.g., an ascending order. Furthermore, since the ordered key-value store is implemented on top of a conventional file storage to take advantage of the existing input/output (IO) stack, the IO path of the ordered key-value store can be long. Specifically, the IO path of the ordered key-value store that is implemented based on a conventional file storage can include multiple layers, with each layer providing separate data processing operations that can increase the burden of the entire system in terms of write amplification and resource utilization. Therefore, the performance of the ordered key-value store can be suboptimal due to the inherent disadvantages of the conventional file storage.

SUMMARY

One embodiment of the present disclosure provides a system and method for facilitating a storage system. During operation, the system can receive a request to write data to a data region in a first non-volatile memory, e.g., a NAND flash memory. The system can determine a key associated with the data. The key can correspond to an entry in a data structure maintained by a volatile memory the storage system. In response to determining the key, the system can write the data to the data region in the first non-volatile memory. The system can update in the volatile memory the data structure entry corresponding to the key with a physical location in the data region of the first non-volatile memory to which the data is written. The system can write the data structure update to a second non-volatile memory. The system can then store a snapshot of the data structure in a metadata region associated with the first non-volatile memory, thereby allowing persistent storage of the data structure.

In some embodiments, prior to receiving any write request, initializing the data structure by pre-allocating the data structure in the volatile system memory with a set of keys in ascending predetermined order and a corresponding set of initialized values.

In some embodiments, the system can update the data structure by modifying the data structure entry by reconnecting a unique correspondence between the key and the physical location while maintaining the physical location of the data in the data region of the first non-volatile memory.

In some embodiments, the entry in the data structure can indicate: the key associated with the data, and the physical location in the first non-volatile memory at which the data is written, wherein the physical location is represented by a physical offset value and a length of the data.

In some embodiments, the volatile system memory can include a dynamic random access memory (DRAM). The first non-volatile memory of the storage system can include a Not-and (NAND) flash memory, and the second non-volatile memory of the storage system can represent a persistent journal.

In some embodiments, the system can write the data structure update to the second non-volatile memory by sequentially appending the data structure update in the second non-volatile memory.

In some embodiments, the system can store a snapshot of the data structure by performing a periodical sequential flushing of the snapshot of the data structure to the metadata region associated with the first non-volatile memory.

In some embodiments, when the data stored in the first non-volatile memory is lost or corrupted, the system can rebuild the data structure by using a recent snapshot of the data structure in the metadata region and a recent data structure update in the second non-volatile memory.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein facilitate improved performance in ordering key-value storage with IO stack simplification.

Conventional key-value stores are usually implemented based on a traditional file storage system to take advantage of the existing IO stack. Specifically, the entire IO path for the key-value store in the file storage system can be long and can include isolated multiple layers. The data processing operations performed in each layer can result in write amplification and resource utilization. Therefore, such data processing operations can result in a multi-fold increase in the total burden on the entire system in terms of write amplification and resource utilization. Such a conventional key-value store is described below in relation to FIG. 1.

Embodiments described herein provide a storage system that is capable of supporting the key-value application with improved performance stability and resource saving by simplifying the IO stack. The system can facilitate IO stack simplification by decoupling data movement initiated by the key-value application with the NAND flash memory garbage collection. Furthermore, an intermediate chunk layer present in the traditional file storage system is removed, thereby reducing the overall write amplification and resource utilization. In addition, the implementation of the key-value mapping by collaborating a volatile buffer, a persistent journal, and periodical snapshot in the metadata region results in reduced access latency and consolidated data consistency.

The above-mentioned IO stack simplification process is described in further detail in relation to FIG. 2, FIG. 3, FIG. 4A-4B, FIG. 5, and FIG. 6. The associated functional modules and units used for implementing the present disclosure are described below in relation to FIG. 7 and FIG. 8.

The term "NAND SSD" refers to an SSD which uses NAND flash memory. NAND flash memory is a type of non-volatile memory that can be used in a storage system.

The terms "mapping table" and "data structure" are used interchangeably in this disclosure, and refers to a table including mappings between a set of keys and a corresponding set of values.

System Architecture of a Key-Value Storage System

Figure 1:
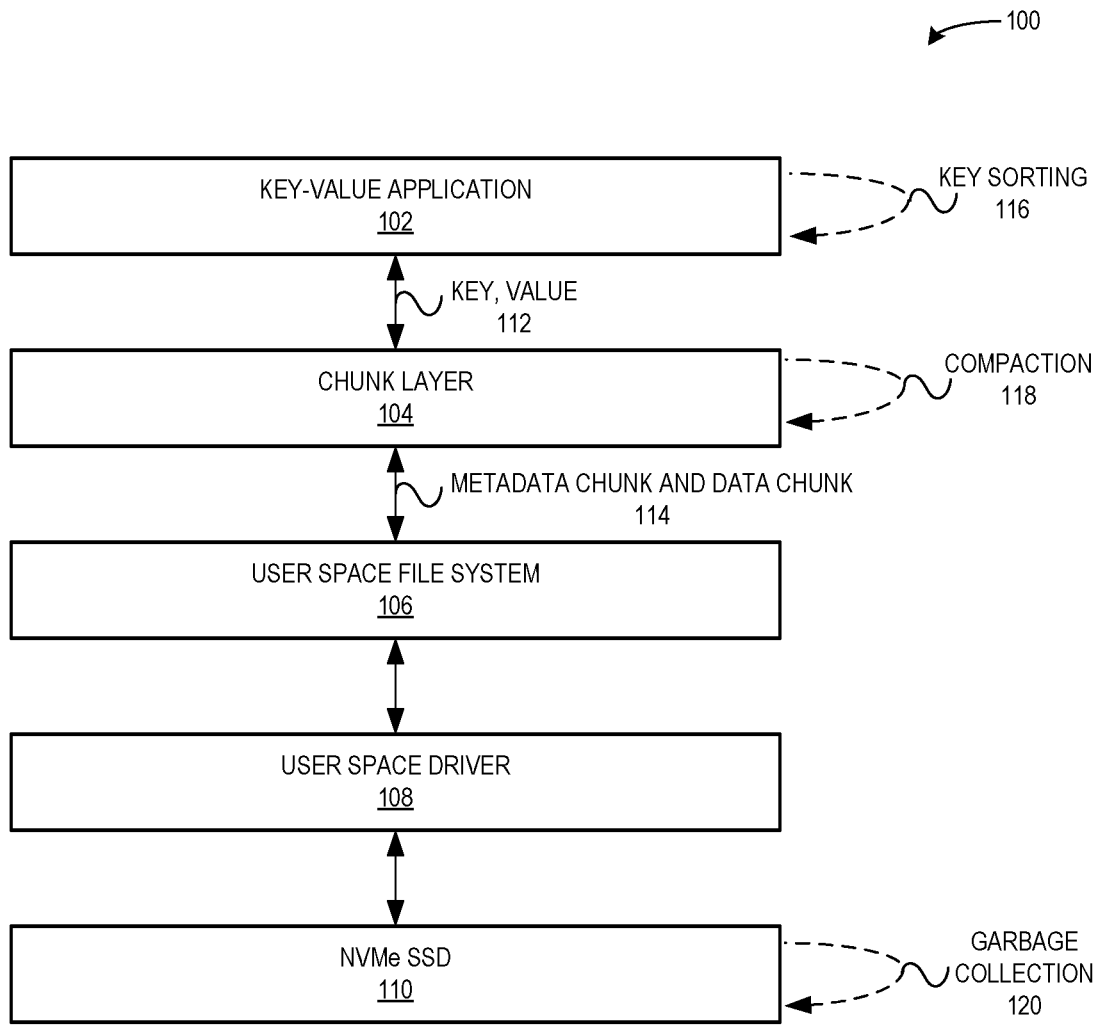
FIG. 1 illustrates an exemplary input/output (IO) hierarchy of a key-value storage system, in accordance with the prior art.

FIG. 1 illustrates an exemplary input/output (IO) hierarchy of a key-value storage system, in accordance with the prior art. Specifically, FIG. 1 shows a conventional key-value storage system 100 implementation using an existing file storage. In system 100, the processing of data is split into multiple stages in multiple layers, e.g., layers 102-110. At key-value application 102 layer, system 100 periodically sorts key-value pairs by arranging the keys in a certain order, e.g., an ascending order. Such periodic key sorting 116 by key-value application 102 can result in data movement of the corresponding values. Since these values correspond to a majority of the data stored in memory, data movement due to key sorting 116 can result in an increase in write amplification.

System 100 can write the plurality of key-value pairs created by key-value application 102 into a file. A typical file system can group a set of files in chunks before writing the chunks into a storage medium. The conventional file system does not support in-place update and can be log-structured, meaning that the files are written in append-only manner. When the updated version of a file is written, the old version of the file is invalidated and needs to be recycled. The invalid data creates holes in existing chunks. Considering that the write is append only, the space holding the invalid data needs to be recycled to form the chunks for the sequential write. The process to merge the chunks with holes (or invalid data) is called compaction.

Since system 100 continuously sends updates from key-value application 102 to chunk layer 104, system 100 performs compaction 118 at chunk layer 104. In other words, system 100 performs compaction 118 on sequentially written chunks to release any unused capacity. For example, a pre-compaction data chunk may include expired data as well as valid data, and a compactor can regroup valid data from multiple pre-compaction data chunks to form a new data chunk that only includes valid data. During compaction, the file system can regroup the valid data from old data chunks to form two new data chunks. Also note that the regrouping of the valid user data is performed in the logical domain. However, such compaction 118 at chunk layer 104 can create a burden for garbage collection in the subsequent layers, as previously valid data is invalidated during compaction 118.

System 100 outputs metadata chunk and data chunk 114 from chunk layer 104. Metadata chunk and data chunk 114 propagate through user space file system 106 and user space drive 108 to non-volatile memory express (NVMe) solid state drive (SSD) 110. With the inclusion of user space file system 106 and user space driver 108 in system 100, the IO path bypasses the kernel, thereby achieving performance improvement. However, key-value storage system 100 is suboptimal due to inherent disadvantages associated with conventional file storage.

Specifically, due to the update and compaction operation at chunk layer 104, previously valid data is invalidated, this can trigger internal garbage collection 120 at NVMe SDD 110. In other words, system 100 can remove mappings to invalid data and their corresponding storage locations can be subject to garbage collection 120 by physical drives, e.g., NVMe SSD 110. Although, recycling of physical spaces by garbage collection 120 provide better performance and endurance for NVMe SSD 110, garbage collection 120 can result in data movement and write amplification due to recycling of invalid data and copying of valid data.

System 100 includes multiple layers 102-110 which can accumulate considerable amount of metadata that needs to be maintained by system 100. Furthermore, system 100 can result in a large amount of data movement and resource consumption in layers 102, 104 and 110. Such multiple levels of data movement can result in a cumulative or multifold write amplification which may deteriorate the performance of system 100 and hence may also affect the service level agreement (SLA). Therefore, during operation of key-value application 102, the system architecture shown in FIG. 1 can result in several orders of write amplification and resource consumption, which can lower the efficiency of system 100 and reduce lifespan of the NAND flash memory. Furthermore, system 100 also needs to support the considerable amount of metadata accumulated by the multiple layers 102-110 stacked together.

Embodiments described herein overcome the drawbacks associated with IO hierarchy of a conventional key-value storage system shown in FIG. 1. Specifically, the embodiments described herein provide a storage system that is capable of supporting the key-value application with improved performance stability and resource saving by simplifying the IO stack. The system can decouple data movement initiated by the key-value application from the NAND flash memory garbage collection. Furthermore, an intermediate chunk layer present in the traditional file storage system can be removed, thereby reducing the overall write amplification and resource utilization. In addition, the implementation of the key-value mapping by collaborating a volatile buffer, a persistent journal, and periodical snapshot in the metadata region results in reduced access latency and consolidated data consistency. Such a simplified IO stack is described below in relation to FIG. 2.

Figure 2:
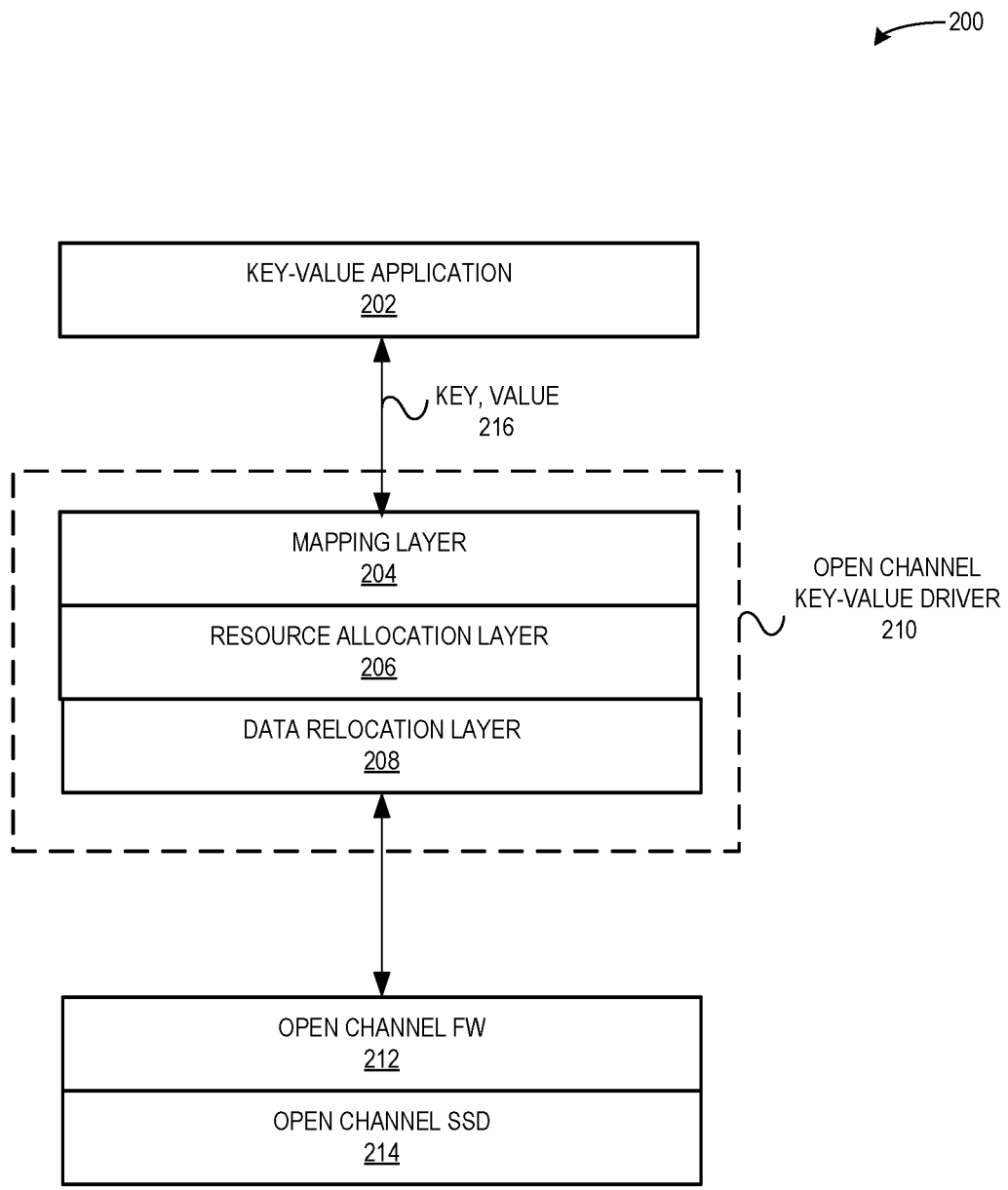
FIG. 2 illustrates an exemplary system architecture of a key-value storage system, in accordance with an embodiment of the present disclosure.

FIG. 2 illustrates an exemplary system architecture of a key-value storage system 200, in accordance with an embodiment of the present disclosure. System 200 can use an open channel key-value driver 210 to connect key-value application 202, open channel (Firmware) FW 212, and open channel SSD 214. Open channel key-value driver 210 can run at the host side of system 200. Open channel key-value driver 210 can include a mapping layer 204, a resource allocation layer 206, and a data relocation layer 208. Mapping layer 204 can build a mapping between a key from key-value application 202 and a physical location in open channel SSD 214 where the corresponding data is stored. Mapping layer 204 can use the key as an index while performing the mapping. System 200 can maintain a mapping table or a data structure including the mappings built by mapping layer 204. Specifically, system 200 can buffer this mapping table in a system memory, e.g., by storing metadata in the mapping table maintained by a volatile system memory, that can provide short access latency.

Resource allocation layer 206 can use the size of a key and the size of the corresponding value to locate a physical location in open channel SSD 214 for accommodating the incoming key-value pair. Data relocation layer 208 can be configured to handle data processing from multiple aspects, e.g., key sorting, chunk compaction, and garbage collection. Open channel SSD 214 can expose its physical storage space to allow the host operating system to take control of managing data placement. In other words, system 200 can expose the NAND resource in open channel SSD 214 as a data bucket to key-value application 202. Accordingly, system 200 can be designed so that the operation of key-value application 202 is compatible with a NAND property in open channel SSD 214.

Figure 3:
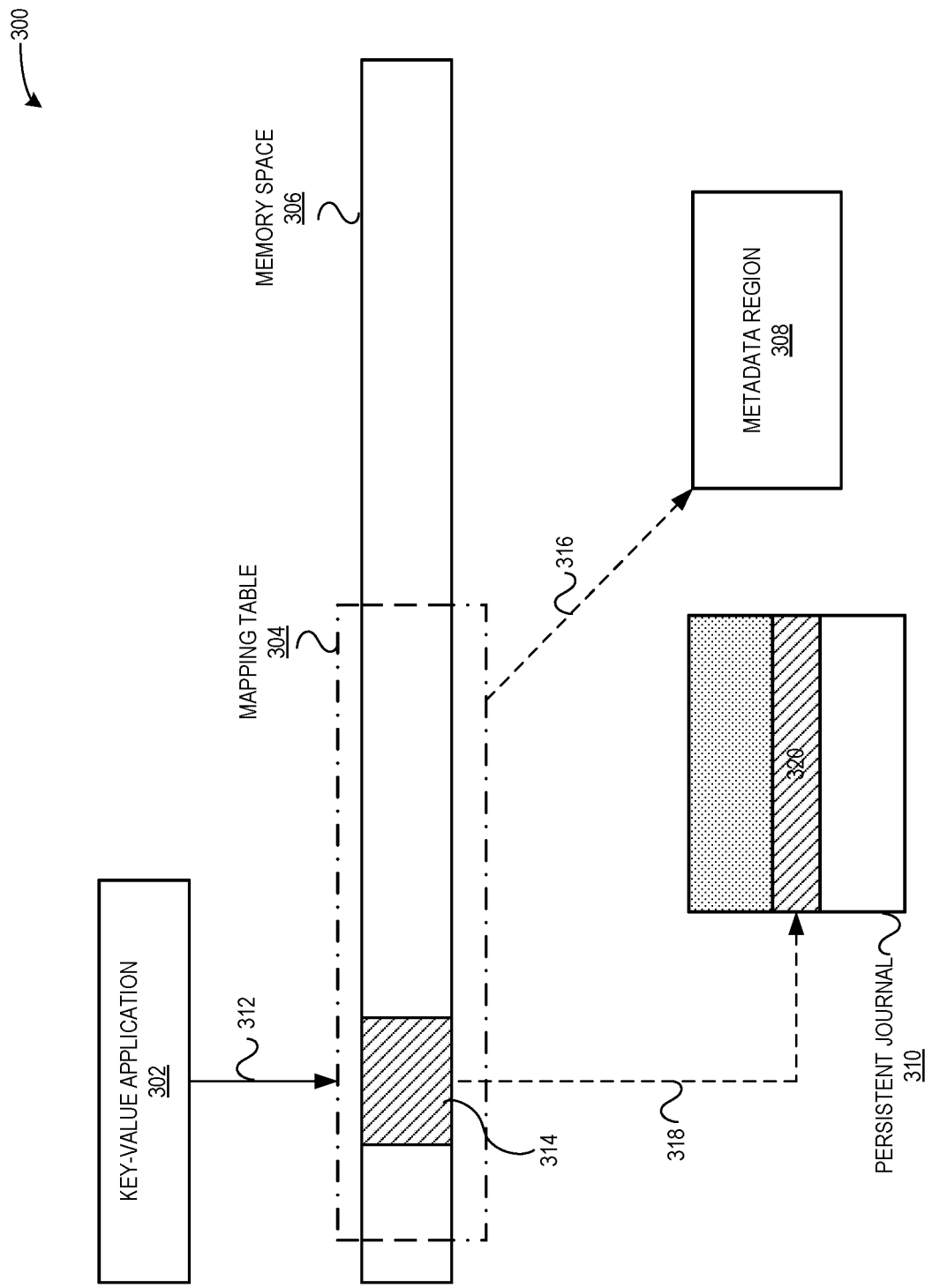
FIG. 3 illustrates an exemplary implementation of a mapping mechanism that supports key sorting, in accordance with an embodiment of the present disclosure.

FIG. 3 illustrates an exemplary implementation of a mapping mechanism 300 that supports key sorting, in accordance with an embodiment of the present disclosure. In mapping mechanism 300, key-value application 302 may determine a key corresponding to data associated with a received data write request. Key-value-application 302 may use open channel key-value driver 210 (shown in FIG. 2) to establish a mapping between the key determined by key-value application 302 and a physical location of the data in a non-volatile memory, e.g., NAND flash memory in open channel SSD 214, where the corresponding data is stored.

Key-value application 302 may insert 312 the key and the physical location mapping into an entry 314 in mapping table 304. In mapping mechanism 300, mapping table 304 can be buffered in a system memory space 306, e.g., volatile system memory, that is capable of providing short access latency. While the key-value storage system updates mapping table 304 with mapping entry 314 at volatile system memory space 306, the key-value storage system can also write 318 mapping entry 314 to a persistent journal area 320 in a persistent journal 310 in an append-only manner, i.e., mapping entry 314 is written at a next sequentially available location in persistent journal 310. In other words, the key-value storage system may synchronize the latest modifications to mapping table 304, e.g., entry 314 represents the latest modification to mapping table 304, in persistent journal area 320 to ensure data consistency.

In one embodiment, the key-value storage system may periodically flush 316 a snapshot of mapping table 304 into a metadata region 308 in a non-volatile memory, e.g., NAND flash memory in open channel SSD. Note that non-volatile memory including metadata region 308 can also include a separate data region for storing data associated with a key in mapping table 304. The data region and metadata region 308 may occupy different physical spaces in the non-volatile memory, e.g., NAND flash memory. Since key-value storage system can store the changes between two subsequent snapshots in persistent journal 310, the key-value storage system can quickly recover from any failure by rebuilding the most recent mapping table or data structure from a most recent snapshot in metadata region 308 and the recent mapping table updates stored in persistent journal area 320. In addition, since persistent journal 310 and metadata region 308 have much less capacity than the capacity for storing content associated with the value in mapping table 304, persistent journal 310 and metadata region 308 provide short access latency and a fast recovery to a recent state or latest version of mapping table 304.

Traditional key-value storage systems may periodically sort sequence of keys in a mapping table. Based on this periodic sorting, the traditional key-value storage system can re-allocate certain locations for data, i.e., key-value pairs, which can result in physically moving the stored data. This periodic re-allocation can consume the resources in the system and increase write amplification. In some of the embodiments described in the present disclosure, subsequent to a mapping table entry 314 update, the key-value storage system may keep the value content at the same physical location. Specifically, instead of moving the value content after an update to mapping table 304, the key-value storage system may match the mapping update by reconnecting a unique correspondence between the key and the physical location.

Furthermore, note that the key-value storage system can convert a random update or insertion of an entry in mapping table 304 into a sequential journal write and a periodical sequential flushing to a non-volatile memory. Specifically, the key-value storage system is capable of performing key sorting without moving the value associated with a key by modifying mapping table entry 314 buffered in system memory 306 and sequentially appending this entry 314 in persistent journal 310. Therefore, the key-value storage system can implement a mapping mechanism that is capable of providing reduced data movement, write amplification, and resource consumption.

Figures 4A, 4B:
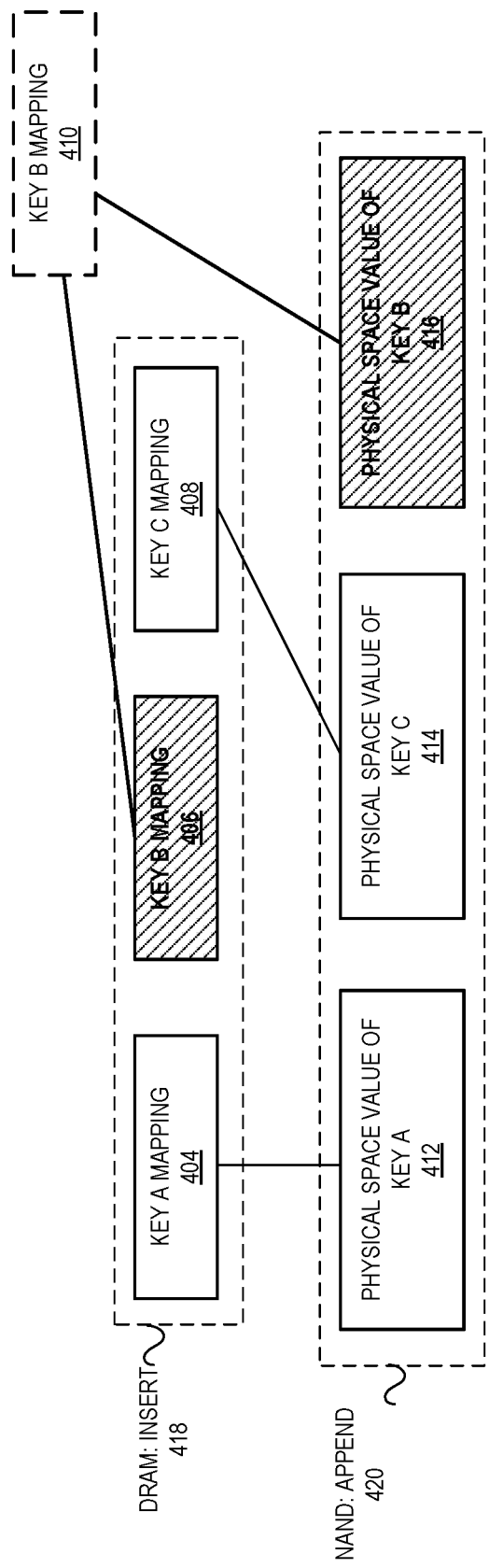
FIG. 4A illustrates an exemplary example of a data structure for a mapping table, in accordance with an embodiment of the present disclosure.
FIG. 4B illustrates an exemplary example of modifying a mapping table to handle key sorting, in accordance with an embodiment of the present disclosure.

FIG. 4A illustrates an exemplary example of a mapping table or a data structure, in accordance with an embodiment of the present disclosure. The system can design the mapping table to use a key associated with a data as the table index or key index 400 and the corresponding physical location of the data as the table content. The physical location can be expressed with two arguments, i.e., physical offset and physical length 402. In one embodiment, the system can pre-allocate the data structure for the mapping table at initialization, such that when data associated with a small incoming key is recorded in the metadata table, instead of shifting the entire table, the system may only fill the corresponding table entry with a valid address for the incoming key. That is, the metadata mapping table can be pre-allocated ahead of time based on an ascending order for the keys. Specifically, the mapping table can follow the ascending order of keys, but the content can be stored per the mapping created based on the availability of the physical location for the data. If a given key is not used, the system can maintain as invalid the corresponding entry for the given key, and the system can also maintain the sequence and the position of the entry. At a later time, when the given key is generated at the pre-allocated entry, the system can record the physical location of the data in the mapping table entry.

FIG. 4B illustrates an exemplary example for modification of a mapping table to handle key sorting, in accordance with an embodiment of the present disclosure. As already mentioned above, the mapping table can be pre-allocated ahead of time in DRAM 418 based on an ascending order for the keys. At initialization, all the keys in the mapping table are mapped to invalid address entries. In the example shown in FIG. 4B, the system first receives a data associated with key A in the mapping table in DRAM 418. The system may use the resource allocation layer (shown in FIG. 2) to sequentially write the data to a physical location 412 in NAND 420 in an append-only manner.

The system can then update the mapping table entry associated with key A 404 with physical location 412. Next, the system may receive data associated with key C, the system may similarly update the mapping table entry associated with key C 408 in DRAM 418 with a physical location 414. Note that after the system updates the mapping table entries for key A and key C, the content associated with key A mapping 404 and key C mapping 408 may include valid addresses, while the content for key B 406 may still include an invalid address. In the example in FIG. 4B, the system may receive data associated with key B after the mapping table entries for key A and key B, i.e., 404 and 408 respectively, have been updated.

Note that even though the data associated with key B is received later than data associated with key C, and even if the physical location associated with key B is place sequentially after physical location of data associated with key C, the system does not shift the entire mapping table nor does the system re-allocate data to a different physical location in NAND. Instead, the system may fill a corresponding table entry with a valid address 416 for key B in the mapping table. In other words, instead of moving the value content after updating the mapping table, the system may keep the value content at the same physical location but may match the mapping table update by reconnecting the unique correspondence 410 between key B 406 and physical location 416. Such a maintenance of the key-value mapping table can reduce the write amplification due to key sorting. Furthermore, since the key-value storage system does not write the key-value pairs to a file and bypasses the chunk layer, chunk compaction is may not be necessary. Therefore, the problem of write amplification due to chunk compaction is solved by the key-value storage system described in the present disclosure.

Figure 5:
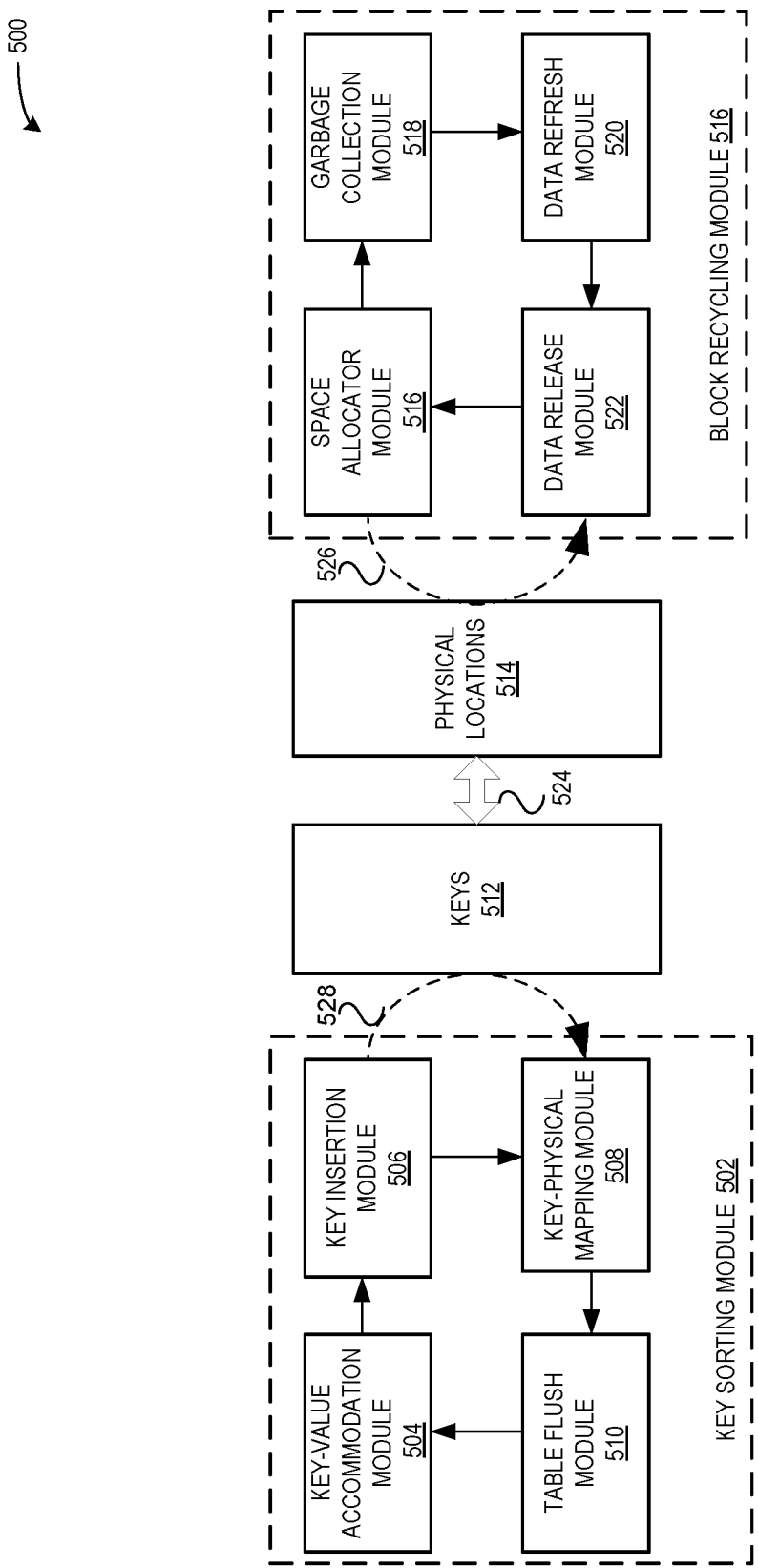
FIG. 5 illustrates an exemplary decoupling of SSD internal garbage collection with the key sorting application, in accordance with an embodiment of the present disclosure.

FIG. 5 illustrates an exemplary decoupling of SSD internal garbage collection with the key sorting application, in accordance with an embodiment of the present disclosure. FIG. 5 shows data movement flow 500 that can be handled by the data relocation layer (shown in FIG. 2). Key sorting module 502 may use a key accommodation module 506 to pre-allocate a data structure for the mapping table at initialization of key sorting module 502, i.e., prior to receiving any write requests. Key insertion module 506 can insert the generated keys 512 into the mapping table in a certain order, e.g., in ascending order. Each key inserted into the mapping table represents a table index. Note that key insertion module 506 can close its loop 528 without changing physical content by the mapping mechanism described in this disclosure.

Key-to-physical mapping module 508 may establish a mapping between the a set of keys 512 in the mapping table and a corresponding set of physical locations 514 associated with data stored in a non-volatile memory. Table flush module 510 can perform a periodical sequential flush of a snapshot of the mapping table from a volatile memory to a metadata region in a non-volatile memory. The key-value storage system can perform key sorting without moving the value associated with a key by modifying mapping table entry buffered in system memory and sequentially appending this entry in persistent journal. The sequential appending of mapping table updates in a persistent journal and periodically writing the snapshots to a metadata region can enforce persistent metadata storage. Therefore, the above-mentioned operations performed by key sorting module 502 may not trigger write amplification and/or garbage collection operations in the non-volatile memory, e.g., NAND flash memory in open channel SSD. The SSD garbage collection may only depend on its own recycling needs.

Block recycling module 516 can control memory management related operations in the non-volatile memory. Specifically, a space allocator module 516 may allocate physical location for the received data in the NAND flash memory in SSD. Since the metadata table updates do not result in moving the corresponding data, the system may isolate 526 the operations in SSD garbage collection module 518. In other words, garbage collection module 518 may only depend on the recycling needs of the NAND flash memory contents. When garbage collection module 518 performs garbage collection on content in physical domain, e.g., NAND, the physical space occupied by any invalid or expired data are identified and reclaimed so that they can be used again. After garbage collection module 518 frees up space for storing new data, data refresh module 520 may update the NAND memory with new data. Data release module 522 may collect unused physical spaces for allocating new data received by key-value storage system.

Figure 6:
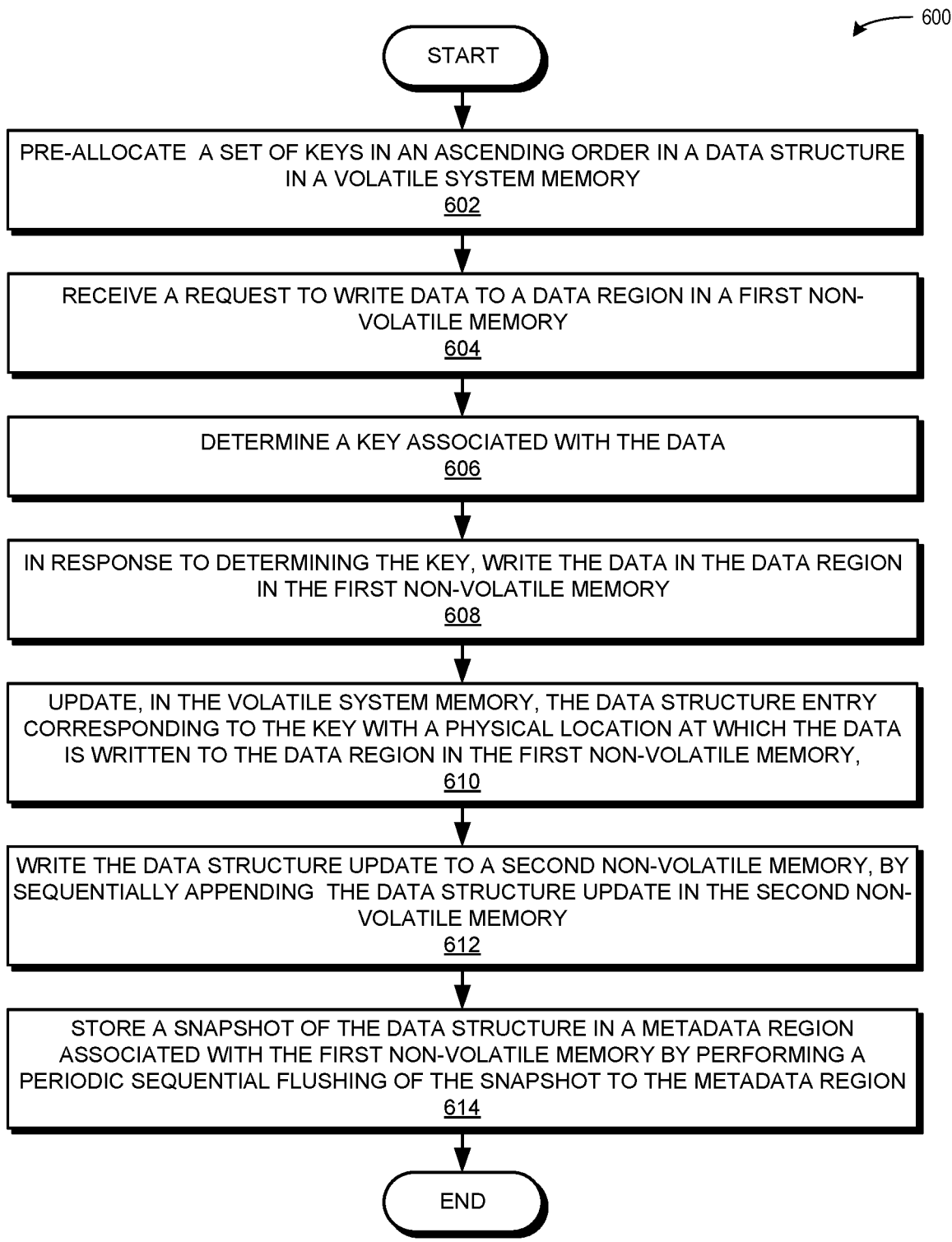
FIG. 6 presents a flowchart illustrating a method for facilitating a storage system, in accordance with an embodiment of the present disclosure.

Note that when block recycling module 516 performs garbage collection, only data in the physical domain is recycled. The new physical location assigned to data in the physical domain due to recycling is updated 524 to the mapping table as physical offset and length. In the conventional key-value storage system, since the application layer, the chunk layer, and the NVMe SSD are in series (shown in FIG. 1), the data movement from the layers above the SSD directly results in multi-fold increase in the write amplification. In some embodiments of the present disclosure, decoupling, i.e., 528 and 526, of key-value application with NAND garbage collection together with the removing of chunk layer, form an efficient path with the effective control on the write amplification. Due to such decoupling, i.e., 528 and 526, the key-value storage system can reduce write amplification during the garbage collection process, reduce the amount of resources spent in the NAND flash memory, and can increase lifespan for the physical media of the NAND flash memory FIG. 6 presents a flowchart illustrating a method for facilitating a storage system, in accordance with the present disclosure. During operation, the system can pre-allocate a set of keys in a data structure in an ascending order (operation 602). The keys can be allocated in the data structure prior to the system receiving or processing any input/output (I/O) requests, and the data structure can be considered a pre-allocated data structure. The system can receive a request to write data to a data region in a first a non-volatile memory (operation 604). The write request can be received from a key-value storage application, as depicted above in relation to FIG. 2. The system can determine a key associated with the data, wherein the key can correspond to a first entry in a data structure maintained by the storage system (operation 606).

In response to the system determining the key, the system can write the data to a physical location in the data region of the first non-volatile memory (operation 608). The physical location can be a next sequentially available location in the data region of the first non-volatile memory. The system can then update the data structure entry corresponding to the key by inserting in the data structure the physical location at which the data was stored in the data region of the first non-volatile memory. (operation 610). The physical location can be denoted in terms of two arguments: physical offset and length of the data in the first non-volatile memory. The system can write the data structure update to a second non-volatile memory by sequentially appending the data structure update in the second non-volatile memory (operation 612). The second non-volatile memory can be a persistent journal which includes a set of data structure updates, with each data structure update associated with a specific version of the mapping table or data structure. The system can then store a snapshot of the data structure in a metadata region in the first non-volatile memory by performing a periodic sequential flushing of the snapshot to the metadata region (operation 614). Note that when the data structure in the volatile memory is lost, e.g., due to power failure, a latest version of data structure update in the persistent journal and latest version of snapshot in the metadata region can be used for quickly rebuilding the lost data structure.

Exemplary Computer System and Apparatus

Figure 7:
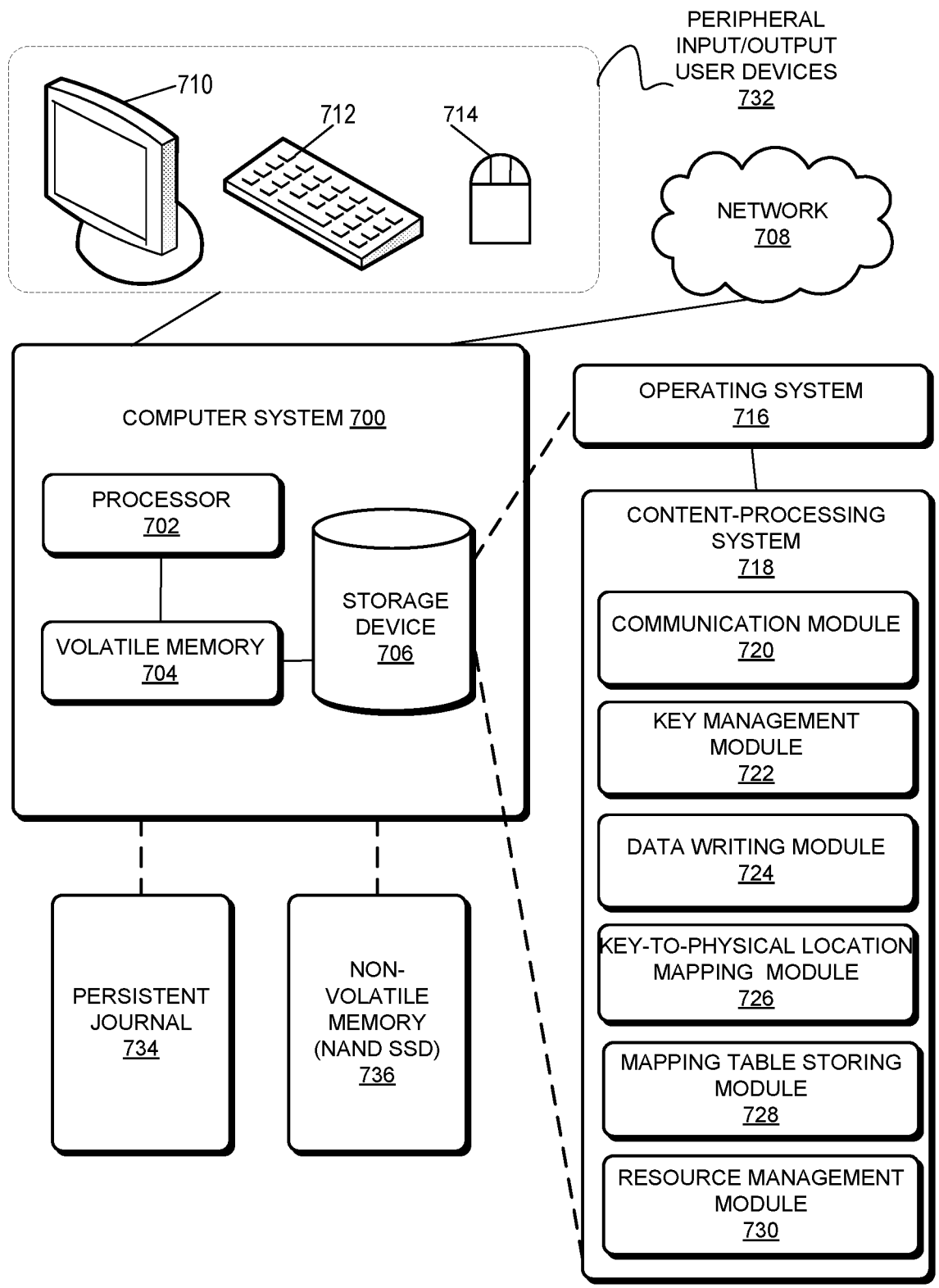
FIG. 7 illustrates an exemplary computer system that facilitates a storage system, in accordance with an embodiment of the present disclosure.

FIG. 7 illustrates an exemplary computer system that facilitates a storage system, in accordance with an embodiment of the present disclosure. Computer system 700 includes a processor 702, a volatile memory 704, and a storage device 706. Volatile memory 704 can include, e.g., dynamic random access memory (DRAM), that serves as a managed memory. Storage device 706 can include persistent storage which can be managed or accessed via processor 702. Furthermore, computer system 700 can be coupled to peripheral input/output (I/O) user devices 732, e.g., a display device 710, a keyboard 712, and a pointing device 714. Storage device 706 can store an operating system 716 and a content-processing system 718. Computer system 700 can also communicate with a first non-volatile memory 736 (such as NAND SSD) and a second non-volatile memory 734 (such as a persistent journal). The first non-volatile memory 736 can sequentially store snapshots of the data structures or mapping tables, in a metadata region, while the data are sequentially stored in a data region. The data region and the metadata region can represent two separate physical regions within the first non-volatile memory. The second non-volatile memory 734 can store data structure updates in an append only manner.

Content-processing system 718 can include instructions, which when executed by computer system 700, can cause computer system 700 to perform methods and/or processes described in this disclosure. Specifically, content-processing system 718 can include instructions for receiving and transmitting data packets, including data to be read or written, an input/output (I/O) request (e.g., a read request or a write request), and metadata and data associated with an I/O request (communication module 720).

In one embodiment, content-processing system 718 can include instructions for receiving a request to write data to a non-volatile memory (communication module 720). Content-processing system 718 can include instructions for determining a key associated with the data, wherein the key can correspond to an entry in a data structure maintained by a storage system (key-management module 722). Content-processing system 718 can include instructions for, prior to receiving the request to write the data, allocating keys in the data structure in an ascending order (key management module 722). Content-processing system 718 can include instructions for writing the data to a physical location in a data region of the first non-volatile memory. The physical location can be a next sequentially available location in the data region of the first non-volatile memory (data writing module 724, which can communicate with first non-volatile memory 736 and store the data in the data region part of the first non-volatile memory).

Content-processing system 718 can include instructions for updating a data structure entry corresponding to the key by inserting the physical location at which the data was stored in the data region of the first non-volatile memory (key-to-physical location mapping 726, which can communicate with volatile memory 704 to store the data structure update). The updated data structure, i.e., the entry with the key and the corresponding inserted physical location of the received data, is subsequently written to persistent journal 734.

Content-processing system 718 can include instructions for storing a snapshot of the data structure in a metadata region in the first non-volatile memory 736 by performing a periodic sequential flushing of the snapshot to the metadata region (mapping table storing module 728, which can communicate with first non-volatile memory 736 and store a snapshot of the data structure, i.e., the mapping table, in the metadata region part of the first non-volatile memory 736).

Content-processing system 718 can include instructions for performing garbage collection in the first non-volatile memory 736 (resource management module 730, which can communicate with first non-volatile memory 736 to perform garbage collection operations).

Figure 8:
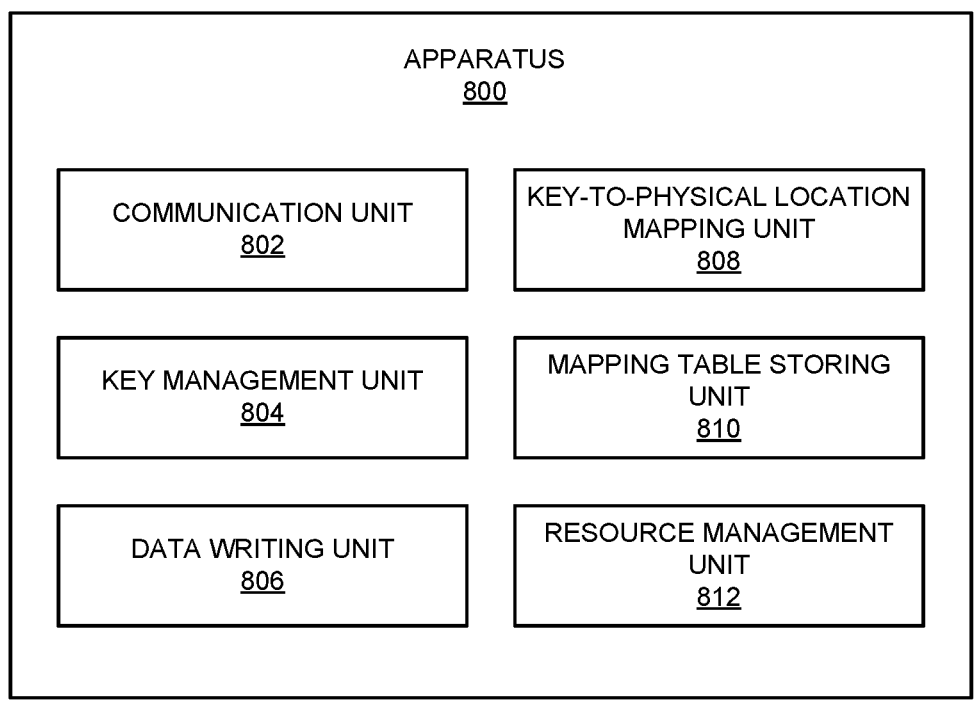
FIG. 8 illustrates an exemplary apparatus that facilitates a storage system, in accordance with an embodiment of the present disclosure.

FIG. 8 illustrates an exemplary apparatus that facilitates a storage system, in accordance with an embodiment of the present disclosure. Apparatus 800 can comprise a plurality of units or apparatuses which may communicate with one another via a wired, wireless, quantum light, or electrical communication channel. Apparatus 800 may be realized using one or more integrated circuits and may include fewer or more units or apparatuses than those shown in FIG. 8. Further, apparatus 800 may be integrated in a computer system, or realized as a separate device or devices capable of communicating with other computer systems and/or devices. Specifically, apparatus 800 can comprise modules or units 802-812 which are configured to perform functions or operations similar to modules 720-730 of computer system 700 of FIG. 7, including: a communication unit 802; a key management unit 804; a data writing unit 806; a key-to-physical location mapping unit 808; a mapping table storing unit 810; and a resource management unit 812.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating a storage system, the method comprising: initializing a data structure maintained by a volatile memory of the storage system by pre-allocating the data structure in the volatile memory of the storage system with a set of keys in ascending predetermined order and a corresponding set of initialized values; receiving a request to write data to a data region in a first non-volatile memory; determining a key associated with the data, wherein the key corresponds to an entry in a the data structure maintained by a the volatile memory the of the storage system; in response to determining the key, writing the data to the data region in the first non-volatile memory; updating, in the volatile memory, the data structure entry corresponding to the key with a physical location in the data region of the first non-volatile memory to which the data is written; and writing the data structure update to a second non-volatile memory.

2. The method of claim 1, wherein updating the data structure further comprises: modifying the data structure entry by reconnecting a unique correspondence between the key and the physical location while maintaining the physical location of the data in the data region of the first non-volatile memory.

3. The method of claim 1, wherein the entry in the data structure indicates: the key associated with the data; and the physical location in the first non-volatile memory at which the data is written, wherein the physical location is represented by a physical offset value and a length of the data.

4. The method of claim 1, wherein the volatile system memory comprises a dynamic random access memory (DRAM); wherein the first non-volatile memory comprises a Not-and (NAND) flash memory; and wherein the second non-volatile memory represents a persistent journal.

5. The method of claim 1, wherein writing the data structure update to the second non-volatile memory comprises: sequentially appending the data structure update in the second non-volatile memory.

6. The method of claim 1, further comprising: storing a snapshot of the data structure in a metadata region in the first non-volatile memory by performing a periodical sequential flushing of the snapshot of the data structure to the metadata region in the first non-volatile memory.

7. The method of claim 1, further comprising: when the data structure stored in the volatile memory is lost or corrupted, rebuilding the data structure by using a recent snapshot in a metadata region in the first non-volatile memory and a recent data structure update in the second non-volatile memory.

8. A computer system, comprising: a processor; and a memory coupled to the processor and storing instructions, which when executed by the processor cause the processor to perform a method for facilitating a storage system, the method comprising: initializing a data structure maintained by a volatile memory of the storage system by pre-allocating the data structure in the volatile memory of the storage system with a set of keys in ascending predetermined order and a corresponding set of initialized values; receiving a request to write data to a data region in a first non-volatile memory; determining a key associated with the data, wherein the key corresponds to an entry in a the data structure maintained by a the volatile memory the of the storage system; in response to determining the key, writing the data to the data region in the first non-volatile memory; updating, in the volatile system memory, the data structure entry corresponding to the key with a physical location in the data region of the first non-volatile memory to which the data is written; and writing the data structure update to a second non-volatile memory.

9. The computer system of claim 8, wherein updating the data structure further comprises: modifying the data structure entry by reconnecting a unique correspondence between the key and the physical location while maintaining the physical location of the data in the data region of the first non-volatile memory.

10. The computer system of claim 8, wherein the entry in the data structure indicates: the key associated with the data; and the physical location in the first non-volatile memory at which the data is written, wherein the physical location is represented by a physical offset value and a length of the data.

11. The computer system of claim 8, wherein the volatile system memory comprises a dynamic random access memory (DRAM); wherein the first non-volatile memory comprises a Not-and (NAND) flash memory; and wherein the second non-volatile memory represents a persistent journal.

12. The computer system of claim 8, wherein writing the data structure update to the second non-volatile memory, comprises: sequentially appending the data structure update in the second non-volatile memory.

13. The computer system of claim 8, wherein the method further comprises: storing a snapshot of the data structure in a metadata region in the first non-volatile memory by performing a periodical sequential flushing of the snapshot of the data structure to the metadata region in the first non-volatile memory.

14. The computer system of claim 8, further comprising: when the data structure stored in the volatile memory is lost or corrupted, rebuilding the data structure by using a recent snapshot in the metadata region in the first non-volatile memory and a recent data structure update in the second non-volatile memory.

15. An apparatus, comprising: a processor; a controller; a volatile memory; a first non-volatile memory; and a second non-volatile memory; wherein the controller store instructions, which when executed by the processor cause the processor to perform a method for facilitating a storage system, the method comprising: initializing a data structure maintained by a volatile memory of the storage system by pre-allocating the data structure in the volatile memory of the storage system with a set of keys in ascending predetermined order and a corresponding set of initialized values; receiving a request to write data to a data region in a first non-volatile memory; determining a key associated with the data, wherein the key corresponds to an entry in a the data structure maintained by a the volatile memory the of the storage system; in response to determining the key, writing the data to the data region in the first non-volatile memory; updating, in the volatile memory, the data structure entry corresponding to the key with a physical location in the data region of the first non-volatile memory to which the data is written; and writing the data structure update to a second non-volatile memory.

16. The apparatus of claim 15, wherein writing the data structure update to the second non-volatile memory, comprises: sequentially appending the data structure update in the second non-volatile memory.

17. The apparatus of claim 15, wherein the method further comprises: when the data structure stored in the volatile memory is lost or corrupted, recovering the data structure by using a recent snapshot in the metadata region in the first non-volatile memory and a recent data structure update in the second non-volatile memory.

18. The apparatus of claim 15, wherein updating the data structure further comprises: modifying the data structure entry by reconnecting a unique correspondence between the key and the physical location while maintaining the physical location of the data in the data region of the first non-volatile memory.

* * * * *